US006758969B2

(12) United States Patent
Caiozza

(10) Patent No.: US 6,758,969 B2
(45) Date of Patent: Jul. 6, 2004

(54) MAGNETICALLY ENHANCED OIL FILTER APPARATUS

(76) Inventor: Joseph C. Caiozza, 321 W. Market St., Long Beach, NY (US) 11561

(*) Notice: Subject to any disclaimer, the term of this patent is extended or adjusted under 35 U.S.C. 154(b) by 99 days.

(21) Appl. No.: 10/267,451

(22) Filed: Oct. 9, 2002

(65) Prior Publication Data
US 2004/0069699 A1 Apr. 15, 2004

(51) Int. Cl.[7] .............................. B01D 35/06; B03C 1/02
(52) U.S. Cl. ........................ 210/223; 210/130; 210/186; 210/438; 210/440; 210/497.01; 210/DIG. 17
(58) Field of Search ................................ 210/130, 168, 210/DIG. 17, 222, 186, 223, 438, 440, 695, 497.01; 184/6.25

(56) References Cited

U.S. PATENT DOCUMENTS

| 4,246,109 A | * | 1/1981 | Manders | 210/130 |
| 5,510,024 A | * | 4/1996 | Caiozza | 210/223 |
| 5,879,549 A | * | 3/1999 | Caiozza | 210/223 |
| 6,426,000 B1 | * | 7/2002 | Caiozza | 210/186 |
| 6,632,354 B2 | * | 10/2003 | Caiozza | 210/223 |

* cited by examiner

Primary Examiner—David A. Reifsnyder

(57) ABSTRACT

Generally, a magnetically enhanced oil filter apparatus includes a cartridge housing which includes an oil input channel and an outlet channel. The cartridge housing defines a cartridge interior space. A magnet unit is affixed to an outside portion of the cartridge housing, whereby a magnetic field from the magnet unit extends into the cartridge interior space providing an interior magnetic field zone. A hollow annular (e.g. cylindrical) filter element is employed. Filter positioning means are provided for supporting and positioning the hollow cylindrical filter element. Oil flow control means are positioned so that portions thereof enter the interior magnetic field zone, for directing oil flow to and from the hollow cylindrical filter element. In this respect, the oil flow control means are positioned with respect to the hollow cylindrical filter element and the interior magnetic field zone to divide the interior magnetic field zone into a pre-filtration magnetic treatment zone and a post-filtration magnetic treatment zone.

21 Claims, 16 Drawing Sheets

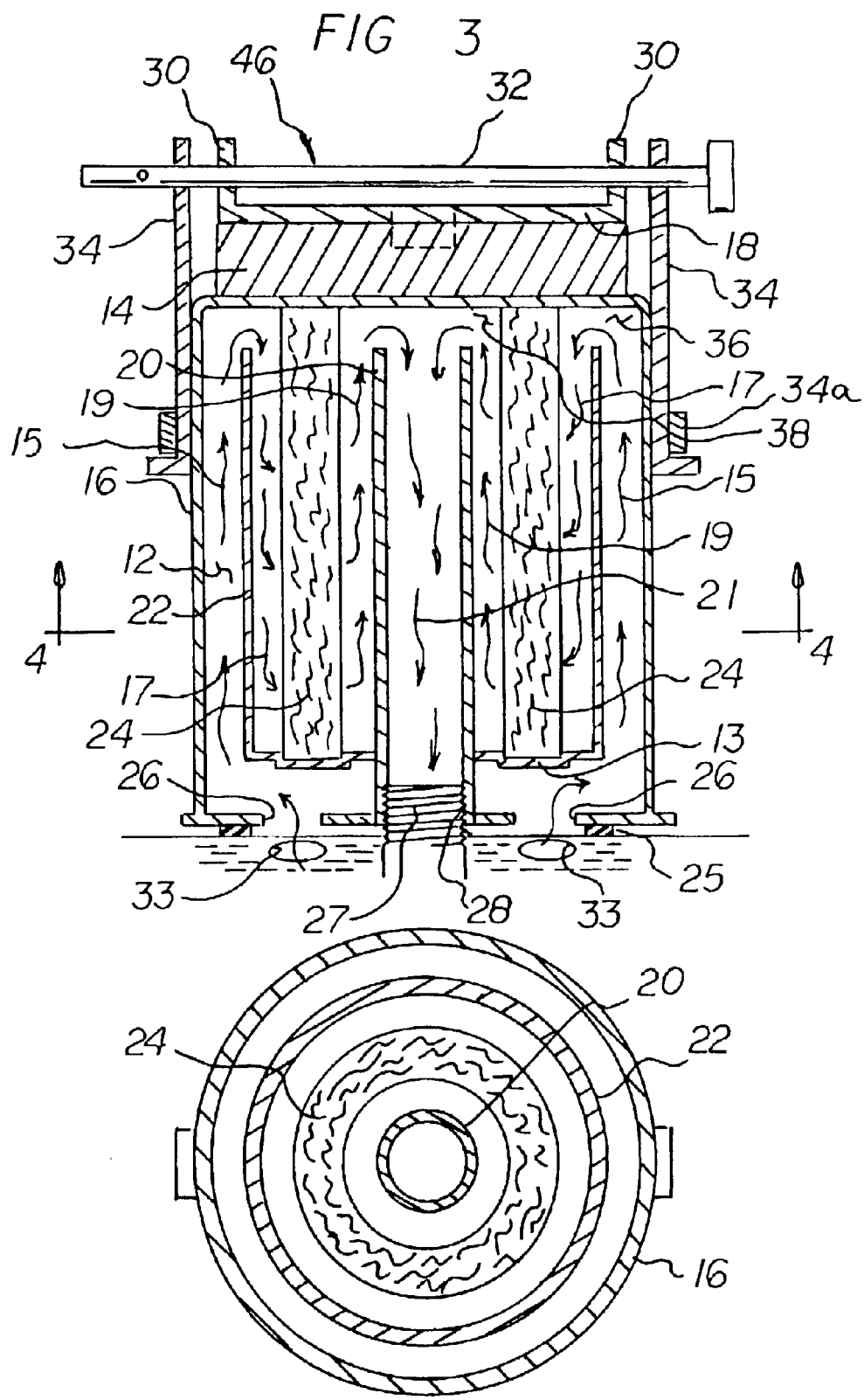

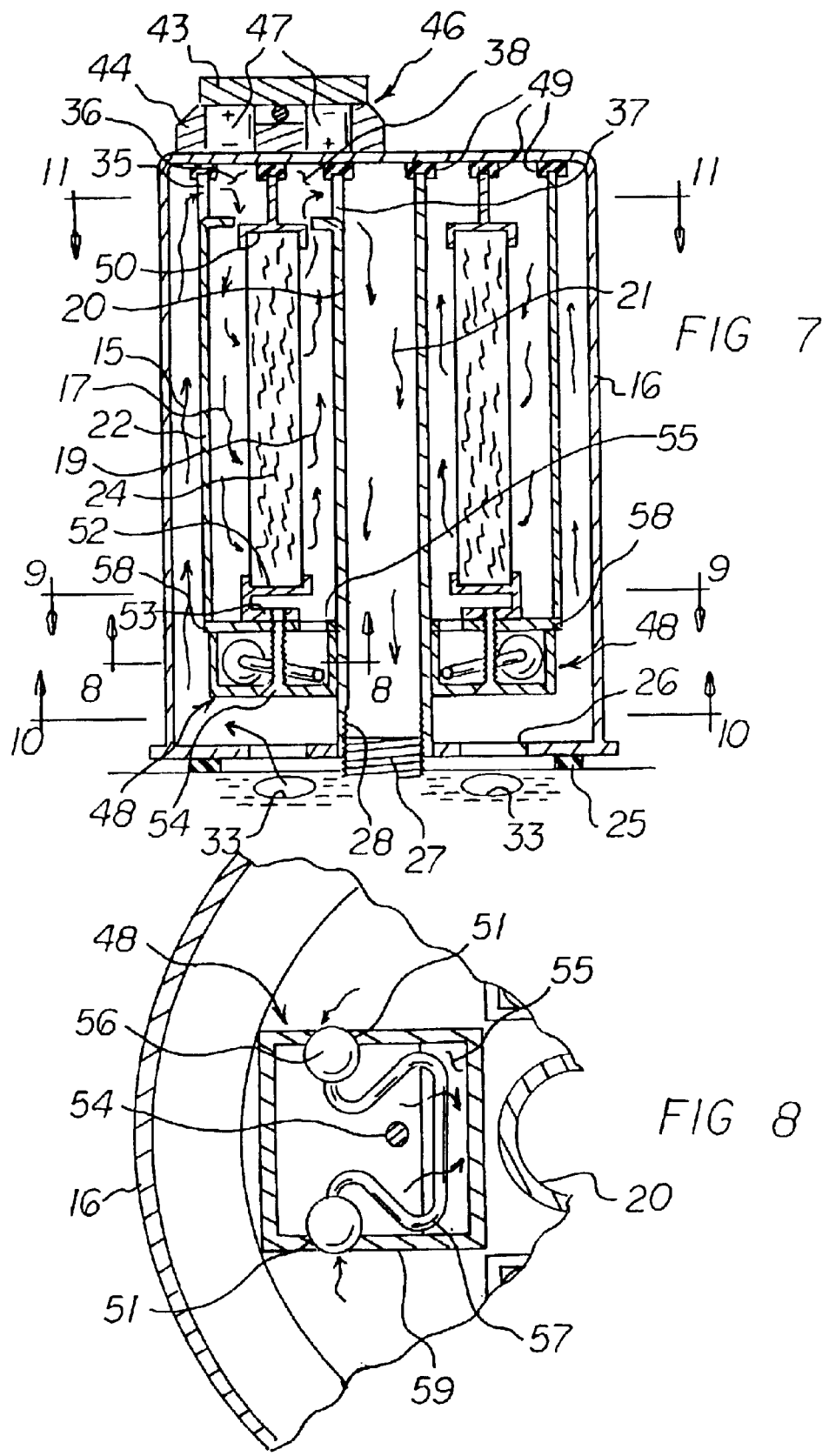

FIG 12a
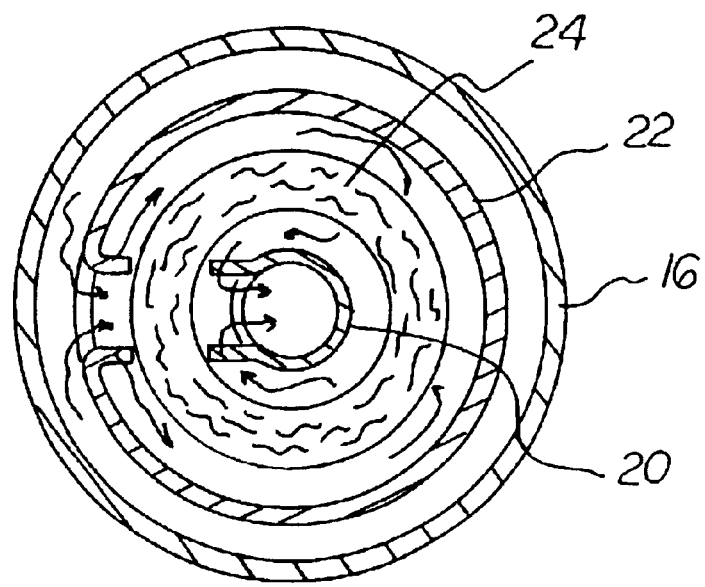
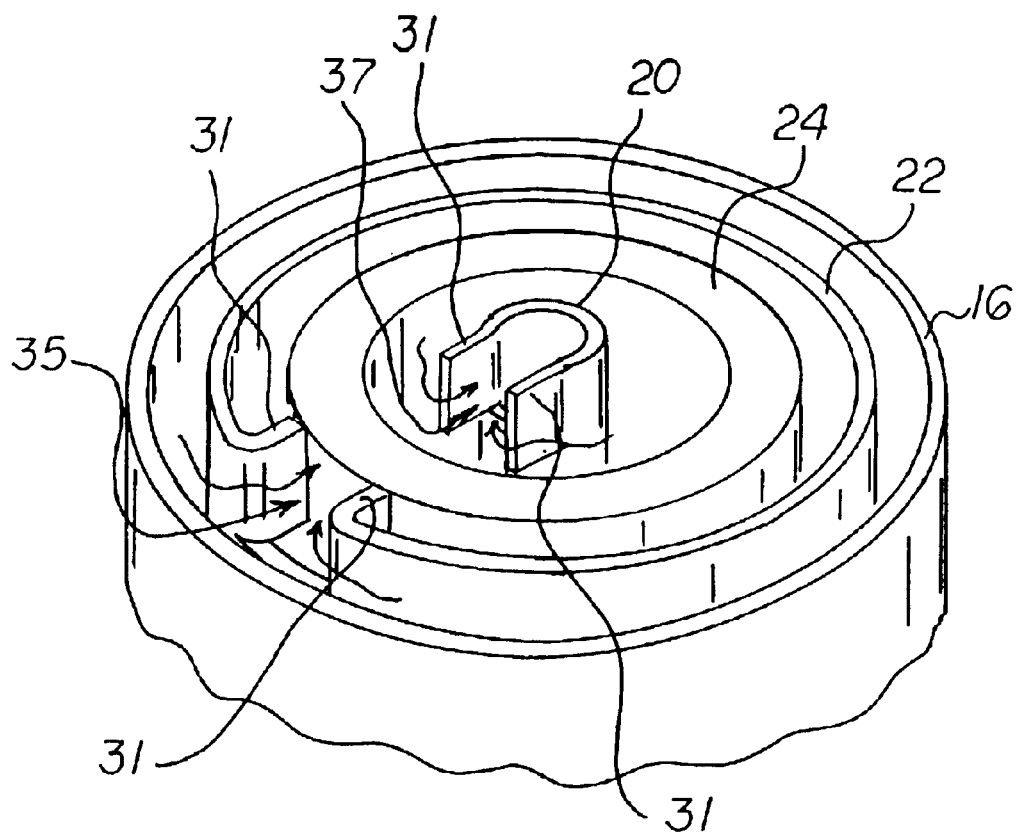
FIG 12b

FIG 15
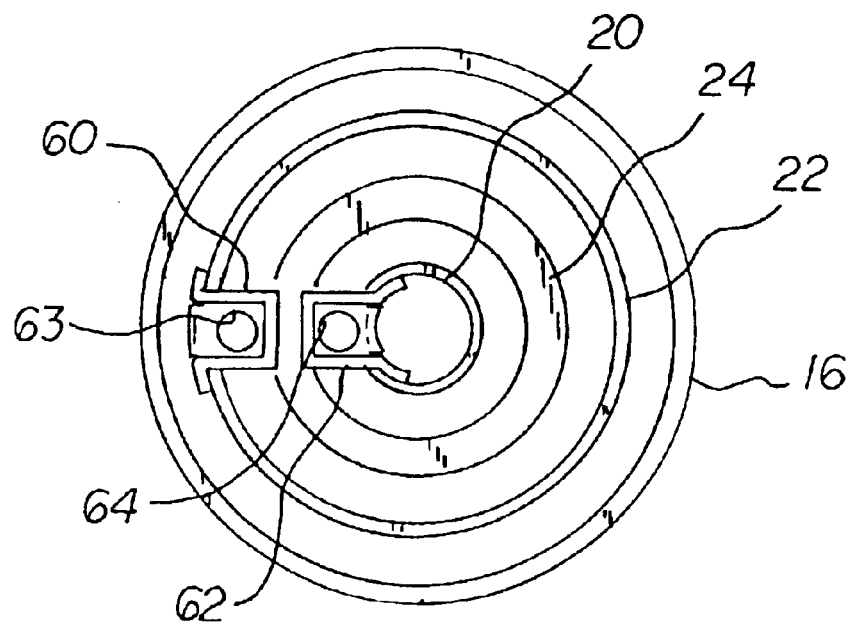
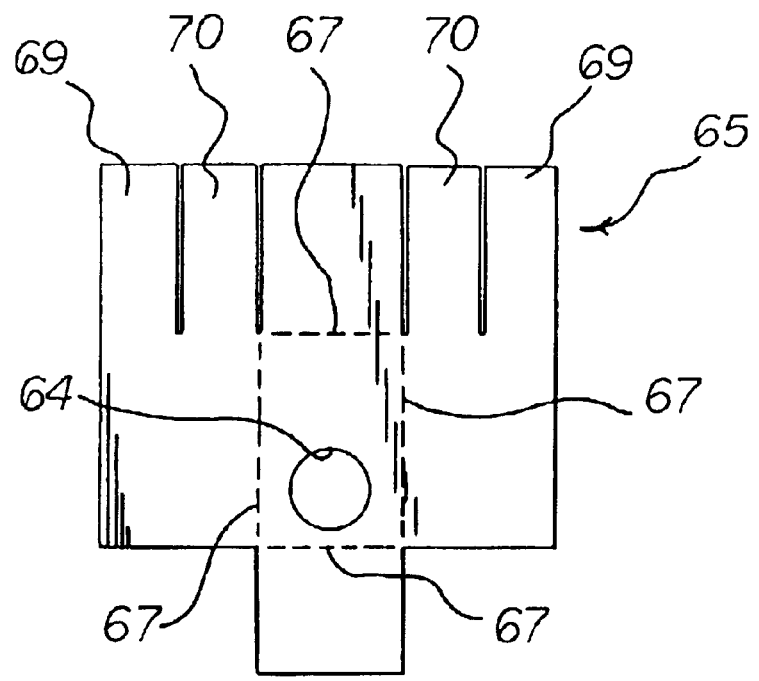
FIG 16

MAGNETICALLY ENHANCED OIL FILTER APPARATUS

BACKGROUND OF THE INVENTION

1. Field of the Invention

The present invention relates generally to oil filter devices and, more particularly, to oil filter devices mounted on motor vehicles.

2. Description of the Prior Art

The use of oil filtering devices for motor vehicles is known in the prior art. In my prior patent U.S. Pat. No. 5,510,024 there is disclosed a magnet assembly or attachment for magnetically collecting metallic particles within an oil filter cartridge. That inventive device includes a pair of magnets supported in a spaced relationship by a carrier which latter is positionable along an exterior of a filter cartridge. The carrier serves an additional function of a heat sink. A shunt couples opposite poles of the magnets together to increase the magnetic flux directed into the filter cartridge to separate and retain metallic particles from the filtered fluid.

An oil lubrication circuit of a motor vehicle includes a variety of components, and such components generally include a cartridge mounting stem for an oil filter cartridge, an oil output channel in the cartridge mounting stem for allowing filtered oil to exit from the oil filter cartridge and circulate in the oil lubrication circuit, and one or more oil input channels, present in the engine for channelling oil from the engine into the oil filter cartridge.

The interior of a conventional oil filter cartridge generally includes a centrally located filtered oil flow space and an array of filter material arrayed circumferentially around the centrally located filtered oil flow space. Inside the conventional oil filter cartridge, oil flows in a diffuse pattern radially from circumferential positions outside the filter material, through the filter material, and into the centrally located filtered oil flow space. It is noted that when the magnet attachment is used for a conventional oil filter cartridge, as disclosed in the above-mentioned U.S. Pat. No. 5,510,024, only a relatively small portion of the oil flowing through the conventional oil filter cartridge is exposed to strong magnetic fields as the oil flows through the conventional oil filter cartridge. To increase the efficiency of a magnet attachment for an oil filter cartridge for trapping ferro-magnetic particles and thereby separating the ferro-magnetic particles from the flowing oil, it would be desirable if an oil filter cartridge were provided which directs a concentrated flow of oil inside the oil filter cartridge in the vicinity of a magnet attachment.

Other related patents of the present inventor include U.S. Pat. No. 5,979,549 and U.S. Pat. No. 6,426,000. In this respect, all of U.S. Pat. No. 5,510,024, U.S. Pat. No. 5,979,549, and U.S. Pat. No. 6,426,000 are incorporated herein by this reference.

In accordance with the teachings of the present inventor's patents, one or more magnet units are attached to the outside of a cartridge housing, and a hollow cylindrical filter element is housed inside the cartridge housing. In this respect, to optimize the effects of the magnetic fields provided by magnet units on the oil flowing inside the cartridge housing, it would be desirable if substantially all of the oil flowing inside the cartridge housing came under the influence of a magnetic field of at least one of the magnet units.

When oil flows through an oil filter cartridge, the oil follows a circuit in which the oil flows up to, through, and away from a hollow cylindrical filter element. To further optimize the effects of magnetic fields of magnet units on the oil flowing inside the oil filter cartridge, it would be desirable if the oil passed through a pre-filtration magnetic treatment zone, prior to passing through the hollow cylindrical filter element, and then passed through a post-filtration magnetic treatment zone, after passing through the hollow cylindrical filter element.

In certain oil filter cartridges, the internal use of bypass valves is known. More specifically, certain high performance engines are sensitive to filter pressure in the filter element. Oil pressure can build up to excessive levels if the filter element is clogged. If the pressure inside the oil filter cartridge reaches an undesirable high level, the valves allow bypass of filter element to return oil under bypassed pressure to the engine. In this respect, it would be desirable if a magnetically enhanced oil filter apparatus were provided that also includes bypass valve units for bypassing a hollow cylindrical filter element in the event that excessive oil pressure builds up inside the oil filter cartridge.

To help prevent the build up of excessive oil pressure inside the oil filter cartridge, and to provide for efficient oil flow inside the oil filter cartridge, it would be desirable if oil flow orifices inside the oil filter cartridge have sufficiently large size to be equal to the size of the orifice from which oil flows out from the oil filter cartridge.

Thus, while the foregoing indicates it to be well known to use magnet units in conjunction with oil filter cartridges, the foregoing does not teach or suggest a magnetically enhanced oil filter apparatus which has the following combination of desirable features: (1) directs a concentrated flow of oil inside the oil filter cartridge in the vicinity of a magnet attachment; (2) provides that substantially all of the oil flowing inside the cartridge housing comes under the influence of a magnetic field of at least one magnet unit; (3) provides that oil passes through a pre-filtration magnetic treatment zone, prior to passing through a hollow cylindrical filter element, and then passes through a post-filtration magnetic treatment zone, after passing through the filter element; (4) can include bypass valve units for bypassing a filter element in the event that excessive oil pressure builds up inside the oil filter cartridge; and (5) provides oil flow orifices inside the oil filter cartridge which have sufficiently large size to be equal to the size of an orifice from which oil flows out from the oil filter cartridge. The foregoing desired characteristics are provided by the unique magnetically enhanced oil filter apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, generally provides a magnetically enhanced oil filter apparatus which includes a cartridge housing which includes a cartridge oil input channel and an outlet channel. The cartridge housing defines a cartridge interior space. A magnet unit is affixed to an outside portion of the cartridge housing, whereby a magnetic field from the magnet unit extends into the cartridge interior space providing an interior magnetic field zone. A hollow cylindrical filter element is employed, and filter positioning means, housed in the cartridge interior space, are provided for supporting and positioning the hollow cylindrical filter element. Oil flow control means are housed in the cartridge interior space and enter the interior magnetic field zone, for directing oil flow to and from the hollow cylindrical filter element. The oil flow control means are positioned with respect to the hollow cylindrical filter element and the interior magnetic field zone such that the interior magnetic field zone is divided into a pre-filtration magnetic treatment zone and a post-filtration magnetic treatment zone.

The filter positioning means include a filter-element-reception well. The outlet channel is internally threaded for attachment to an externally threaded cartridge mounting stem.

With one embodiment, the magnet unit includes a disk-shaped magnet placed on the top of the cartridge housing, and the disk-shaped magnet is coextensive with the entire top surface of the cartridge housing. A magnetic flux concentrator plate is placed on top of the disk-shaped magnet. Retention-rod-reception brackets extend upward from the flux concentrator plate. Retention plates are affixed to side portions of the cartridge housing. A retention rod is threaded through the retention plates and the retention-rod-reception brackets for fixing the disk-shaped magnet and the flux concentrator plate on the cartridge housing.

The oil flow control means are in a form of a dual, concentric flow tube assembly which includes an outer flow control tube and an inner flow control tube. The hollow cylindrical filter element is positioned between the outer flow control tube and the inner flow control tube.

With another embodiment, the magnet unit covers only about one-half of the top of the cartridge housing. The cartridge housing includes first magnet unit mounting brackets. The magnet unit includes a heat sink portion, and cylindrical magnets are contained within the heat sink portion. A magnet concentrator plate is placed on top of the heat sink portion over the cylindrical magnets. Second magnet unit mounting brackets include mounting tabs received in the first magnet unit mounting brackets. A lock bolt is threaded through the second magnet unit mounting brackets and the heat sink portion.

With another embodiment, the outer flow control tube includes a pre-filtration zone passageway, and the inner flow control tube includes a post-filtration zone passageway. The filter positioning means include a top filter cartridge holding channel member and a bottom top filter cartridge holding channel member. The outer flow control tube, the inner flow control tube, and the top filter cartridge holding channel member are supported inside the cartridge housing by means of concentric flow-director-tube-reception gaskets.

With another embodiment, a valve unit mounting bracket is connected to a bottom portion of the bottom top filter cartridge holding channel member. A valve unit mounting plate is positioned next to the valve unit mounting bracket, and a bypass valve unit is connected to the valve unit mounting plate. A valve unit mounting screw is employed for connecting the bypass valve unit to the valve unit mounting plate and the valve unit mounting bracket.

The bypass valve unit includes a bypass valve housing, a bypass entrance channel, and a bypass exit channel in the bypass valve housing. A valving element is located at the bypass entrance channel, and a valving-element tension spring controls operation of the valving element.

The valve unit mounting plate includes four fastener-reception channels for receiving four bypass valve units. Also, four bypass valve units are arrayed at degree intervals around the inner flow control tube.

With another embodiment, the pre-filtration zone passageway is formed by a horizontal tab made from the outer flow control tube, and the post-filtration zone passageway is formed by a horizontal tab made from the inner flow control tube.

With another embodiment, the pre-filtration zone passageway is formed by vertical passageway walls made in the outer flow control tube, and the post-filtration zone passageway is formed by vertical passageway walls made in the inner flow control tube.

With another embodiment, the pre-filtration zone passageway is formed as a first funnel clip orifice, and the post-filtration zone passageway is formed as a second funnel clip orifice.

The first funnel clip orifice is formed in a pre-filtration funnel clip that clips into an opening in the outer flow control tube, and the second funnel clip orifice is formed in a post-filtration funnel clip that clips into an opening in the inner flow control tube.

With another embodiment, a first magnet unit is placed on the outside of the cartridge housing in a first position. The first position is in registration with a first flow orifice in the outer flow control tube, whereby the pre-filtration magnetic treatment zone is situated between the first position and the first flow orifice. A second magnet unit is placed on the outside of the cartridge housing in a second position which is in registration with the inner flow control tube, whereby the post-filtration magnetic treatment zone is situated between the second position and the inner flow control tube.

With another embodiment, the cartridge housing includes a housing bottom lip and further includes a housing mounting plate which has amounting plate lip. A lip-to-lip gasket is placed between the housing bottom lip and the mounting plate lip, and a lip-gasket-lip clamping member clamps the housing bottom lip to the mounting plate lip with the lip-to-lip gasket therebetween.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a number of preferred embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved magnetically enhanced oil filter apparatus which has all of the advantages of the prior art and none of the disadvantages.

It is another object of the present invention to provide a new and improved magnetically enhanced oil filter apparatus which may be easily and efficiently manufactured and marketed.

It is a further object of the present invention to provide a new and improved magnetically enhanced oil filter apparatus which is of durable and reliable construction.

An even further object of the present invention is to provide a new and improved magnetically enhanced oil filter apparatus which is susceptible of a low cost of manufacture with regard to both materials and labor, and which accordingly is then susceptible of low prices of sale to the consuming public, thereby making such magnetically enhanced oil filter apparatus available to the buying public.

Still yet a further object of the present invention is to provide a new and improved magnetically enhanced oil filter apparatus which directs a concentrated flow of oil inside the oil filter cartridge in the vicinity of a magnet attachment.

Still another object of the present invention is to provide a new and improved magnetically enhanced oil filter apparatus that provides that substantially all of the oil flowing inside the cartridge housing comes under the influence of a magnetic field of at least one magnet unit.

Yet another object of the present invention is to provide a new and improved magnetically enhanced oil filter apparatus which provides that oil passes through a pre-filtration magnetic treatment zone, prior to passing through a hollow cylindrical filter element, and then passes through a post-filtration magnetic treatment zone, after passing through the filter element.

Even another object of the present invention is to provide a new and improved magnetically enhanced oil filter apparatus that can include bypass valve units for bypassing a filter element in the event that excessive oil pressure builds up inside the oil filter cartridge.

Still a further object of the present invention is to provide a new and improved magnetically enhanced oil filter apparatus which provides oil flow orifices inside the oil filter cartridge which have sufficiently large size to be equal to the size of an orifice from which oil flows out from the oil filter cartridge.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 3 is a cross-sectional view of the embodiment of the magnetically enhanced oil filter apparatus of FIG. 2 taken along line 3—3 thereof.

FIG. 4 is a cross-sectional view of the embodiment of the magnetically enhanced oil filter apparatus of FIG. 3 taken along line 4—4 thereof.

FIG. 7 is a cross-sectional view of the embodiment of the invention of FIG. 6, taken along line 7—7 thereof.

FIG. 8 is a cross-sectional view of the embodiment of the invention of FIG. 7, taken along line 8—8 thereof.

FIG. 12a is a view of a cross-sectional view of another embodiment of the invention in which a pre-filtration zone passageway and a post-filtration zone passageway are provided by vertical passageway walls.

FIG. 12b is a perspective of the embodiment of the invention shown in FIG. 12a.

FIG. 15 is a top view of the embodiment of the invention shown in FIG. 14.

FIG. 16 is a top view of a blank used in forming a pre-filtration funnel clip or a post-filtration funnel clip shown in FIGS. 13–15.

DESCRIPTION OF THE PREFERRED EMBODIMENT

Figure 1:
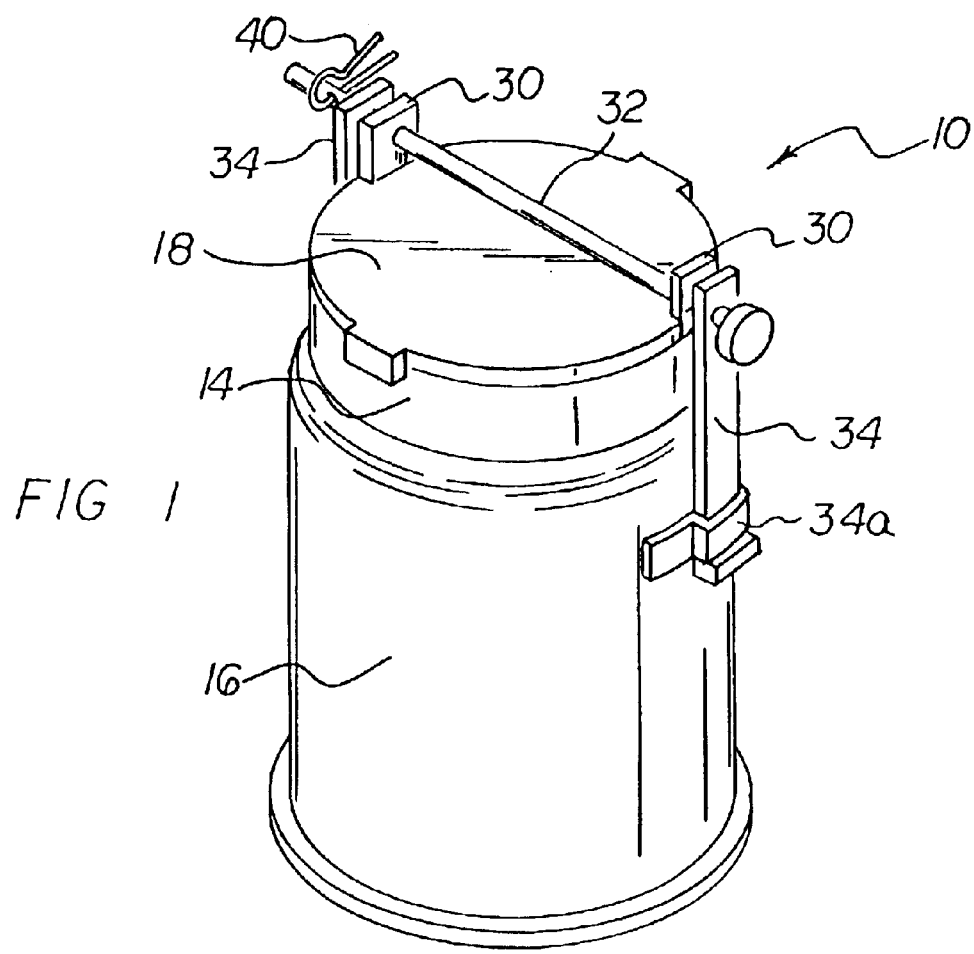
FIG. 1 is a top perspective view showing a first embodiment of the magnetically enhanced oil filter apparatus of the invention.
Figure 2:
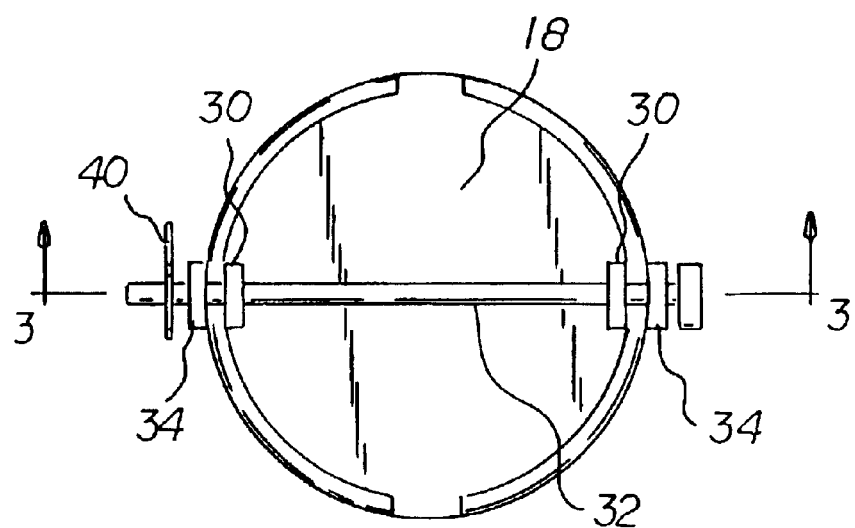
FIG. 2 is a top view of the embodiment of the magnetically enhanced oil filter apparatus shown in FIG. 1.
Figure 5:
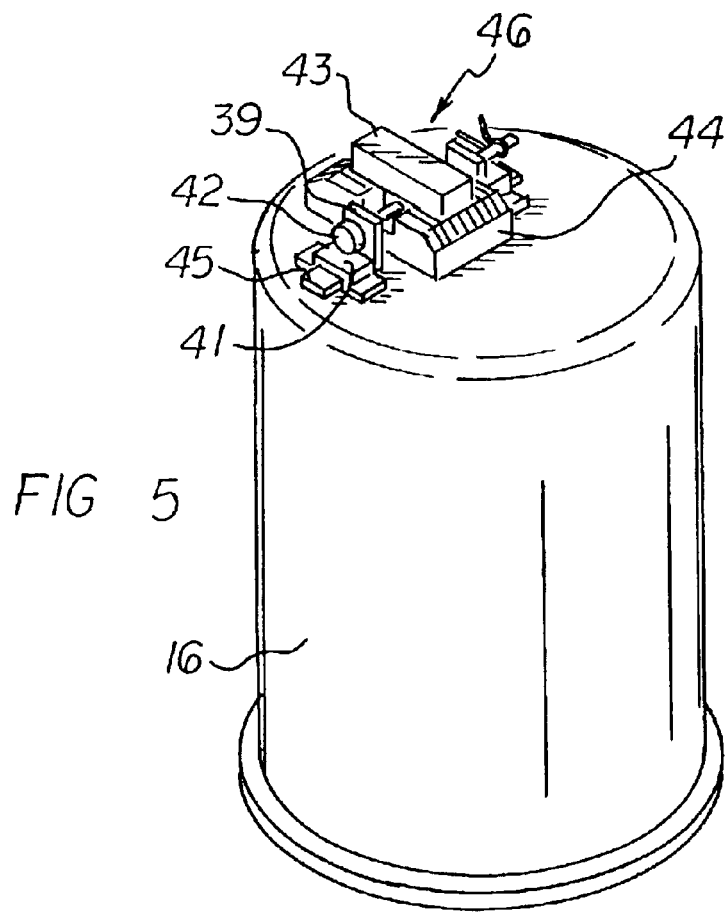
FIG. 5 is a top perspective view of another embodiment of the magnetically enhanced oil filter apparatus of the invention.
Figure 6:
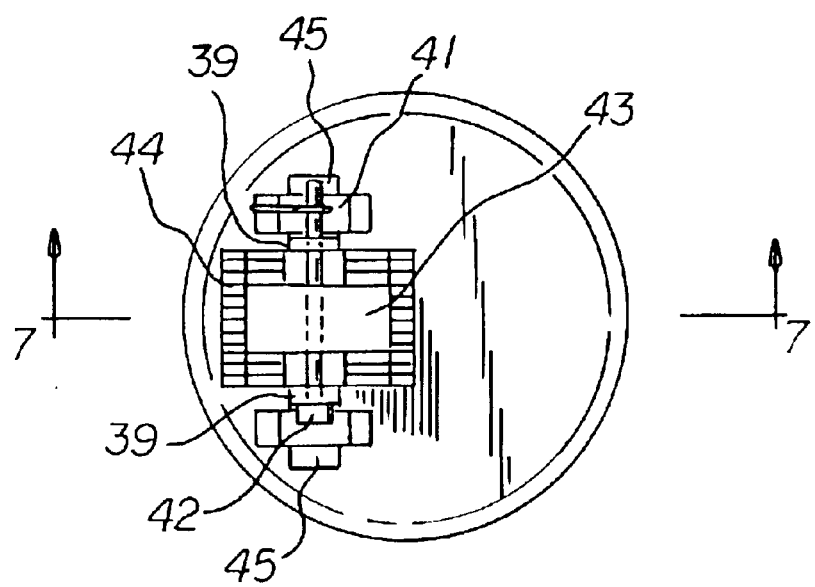
FIG. 6 is a top view of the embodiment of the invention shown in FIG. 5.

With reference to the drawings, a new and improved magnetically enhanced oil filter apparatus embodying the principles and concepts of the present invention will be described.

In general, the present invention provides magnetically enhanced oil filter apparatus 10 which includes a cartridge housing 16 which includes a cartridge oil input channel 26 and an outlet channel 28. The cartridge housing 16 defines a cartridge interior space 12. A magnet unit 46 is affixed to an outside portion of the cartridge housing 16, whereby a magnetic field from the magnet unit 46 extends into the cartridge interior space 12 providing an interior magnetic field zone. A hollow annular (e.g. cylindrical) filter element 24 is employed, and filter positioning means, housed in the cartridge interior space 12, are provided for supporting and positioning the hollow cylindrical filter element 24. Oil flow control means are housed in the cartridge interior space 12 and enter the interior magnetic field zone, for directing oil flow to and from the hollow cylindrical filter element 24. The oil flow control means are positioned with respect to the hollow cylindrical filter element 24 and the interior magnetic field zone such that the interior magnetic field zone is divided into a pre-filtration magnetic treatment zone 36 and a post-filtration magnetic treatment zone 38.

As shown in the embodiment of the invention illustrated in FIGS. 1–4, the filter positioning means include a filter-element-reception well 13. The hollow annular or cylindrical filter element 24 can be a conventional hollow cylindrical filter element 24. The outlet channel 28 is internally threaded for attachment to an externally threaded cartridge mounting stem 27 on an engine. A cartridge-to-block gasket 25, which can be a conventional O-ring, is provided between the cartridge housing 16 and an engine block.

The magnet unit 46 includes a disk-shaped magnet 14 placed on the top of the cartridge housing 16, and the disk-shaped magnet 14 is coextensive with the entire top surface of the cartridge housing 16. A magnetic flux concentrator plate 18 is placed on top of the disk-shaped magnet 14. Retention-rod-reception brackets 30 extend upward from the flux concentrator plate 18. Slidable retention plates 34 are affixed respectively to side portions of the cartridge housing 16 by means of an abutment member on the distal end of each retention plate cooperatively engaging a corresponding strap 34a suitably attached to the exterior surface of housing 16 substantially as shown. A retention rod 32 is threaded through the retention plates 34 and the retention-rod-reception brackets 30 for fixing the disk-shaped magnet 14 and the flux concentrator plate 18 on the cartridge housing 16. A cotter pin 40 is used to secure the retention rod 32 to the retention plates 34 and the retention-rod-reception brackets 30. The magnetic flux concentrator plate 18 is made from ferro-magnetic material, and is used to create a higher magnetic flux on underside of magnet. The use of such a magnetic flux concentrator plate 18 is disclosed in U.S. Pat. No. 5,510,024, incorporated herein by reference.

The oil flow control means are in a form of a dual, concentric flow tube assembly which includes an outer flow control tube 22 and an inner flow control tube 20. The hollow cylindrical filter element 24 is positioned between the outer flow control tube 22 and the inner flow control tube 20.

Operation of the embodiment of the invention shown in FIGS. 1–4 is described as follows. Oil that is pumped by the engine oil pump (not shown) passes through engine oil output channels 33 and through cartridge oil input channels 26 and into the cartridge interior space 12. The cartridge-to-block gasket 25 prevents oil from leaking out between the engine block and the cartridge housing 16. Once the oil enters the cartridge interior space 12, the oil flows upward, as indicated by directional arrow 15 in the space between the outside wall of the outer flow control tube 22 and the cartridge housing 16. When the oil reaches the top of the outer flow control tube 22, the oil enters the pre-filtration magnetic treatment zone 36, whereby the oil is treated by the magnetic field of the disk-shaped magnet 14. Then, the oil flows downward, as indicated by directional arrow 17, into the space between the inside wall of the outer flow control tube 22 and the outside surface of the hollow cylindrical filter element 24. Oil flows through the hollow cylindrical filter element 24 and enters the space between the inside surface of the hollow cylindrical filter element 24 and the outside surface of the inner flow control tube 20. Then, filter-element filtered oil flows upward, as indicated by directional arrow 19. When the oil reaches the top of the inner flow control tube 20, the oil enters the post-filtration magnetic treatment zone 38 and is again treated by the magnetic field of the disk-shaped magnet 14. Then, the twice-magnetically treated and filtered oil flows downward, as indicated by directional arrow 21, and into the cartridge mounting stem 27 and back into the engine.

Turning to FIGS. 5–12b, another embodiment of the invention is shown. Reference numerals are shown that correspond to like reference numerals that designate like elements shown in the other figures. In addition, the magnet unit 46 covers only about one-half of the top of the cartridge housing 16. The cartridge housing 16 includes first magnet unit mounting brackets 41. The magnet unit 46 includes a heat sink portion 44, and cylindrical magnets 47 are contained within the heat sink portion 44. A magnet concentrator plate 43 is placed on top of the heat sink portion 44 over the cylindrical magnets 47. Second magnet unit mounting brackets 39 include mounting tabs 45 received in the first magnet unit mounting brackets 41. A lock bolt 42 is threaded through the second magnet unit mounting brackets 39 and the heat sink portion 44.

The outer flow control tube 22 includes a pre-filtration zone passageway 35, and the inner flow control tube 20 includes a post-filtration zone passageway 37. The filter positioning means includes a top filter cartridge holding channel member 50 and a bottom top filter cartridge holding channel member 52. The outer flow control tube 22, the inner flow control tube 20, and the top filter cartridge holding channel member 50 are supported inside the cartridge housing 16 by means of concentric flow-director-tube-reception gaskets 49.

A valve unit mounting bracket 53 is connected to a bottom portion of the bottom top filter cartridge holding channel member 52. A valve unit mounting plate 58 is positioned next to the valve unit mounting bracket 53, and a bypass valve unit 48 is connected to the valve unit mounting plate 58. A valve unit mounting screw 54 is employed for connecting the bypass valve unit 48 to the valve unit mounting plate 58 and the valve unit mounting bracket 53.

The bypass valve unit 48 permits oil to bypass the hollow cylindrical filter element 24 if oil pressure exceeds the trigger pressure point for the bypass valve unit 48. The bypass valve unit 48 includes a bypass valve housing 59, and a bypass entrance channel 51, and communicates through a bypass exit channel 55, which may be a suitable opening or openings in the mounting plate 58, with the post-filtration zone passageway 37. A valving element 56 is located at the bypass entrance channel 51, and a valving-element tension spring 57 controls operation of the valving element 56.

When the bypass valve unit 48 is not activated by excessive oil pressure, the flow of oil through the pre-filtration magnetic treatment zone 36, the hollow cylindrical filter element 24, and the post-filtration magnetic treatment zone 38 occurs as described above with respect to the first embodiment of the invention.

On the other hand, when the pressure activation pressure of the bypass valve unit 48 is reached, the valving elements 56 are unseated from the bypass entrance channels 51 by oil pressure which overcomes the bias of the valving-element tension spring 57, and oil flows through the bypass valve unit 48 and out through the bypass exit channel 55, in order to bypass the hollow cylindrical filter element 24, and into the space between the inside surface of the hollow cylindrical filter element 24 and the inside surface of the inner flow control tube 20. Then, the bypassed oil flows in accordance with directional arrow 19 into the post-filtration magnetic treatment zone 38 and through the inner flow control tube 20, as indicated by directional arrow 21. When the bypass valve unit 48 operates, oil flows to the post-filtration magnetic treatment zone 38 without having been filtered by the hollow cylindrical filter element 24 and without having been magnetically treated in the pre-filtration magnetic treatment zone 36.

Figure 9:
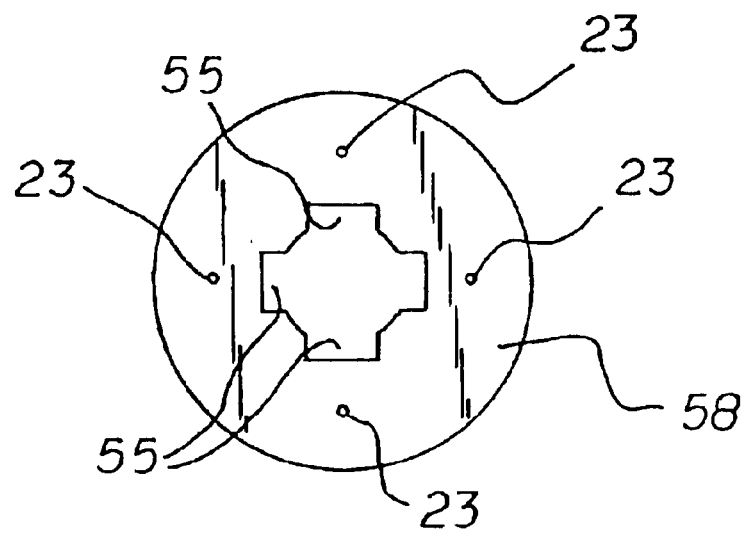
FIG. 9 is a cross-sectional view of the embodiment of the invention of FIG. 7, taken along line 9—9 thereof.
Figure 10:
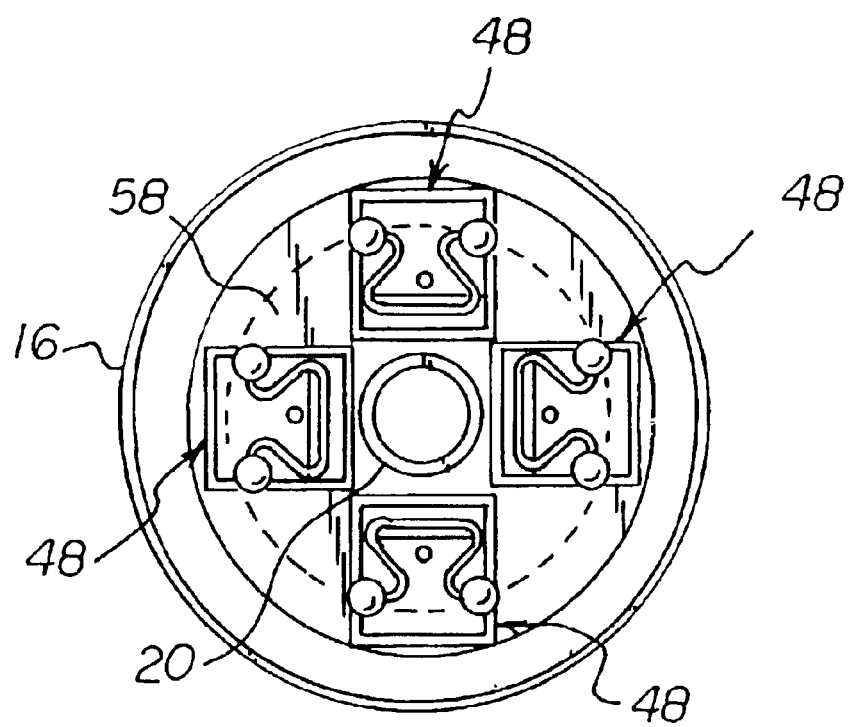
FIG. 10 is a cross-sectional view of the embodiment of the invention of FIG. 7, taken along line 10—10 thereof.

As shown in FIGS. 9 and 10, the valve unit mounting plate 58 includes four fastener-reception channels 23 for receiving four bypass valve units 48. Also, four bypass valve units 48 are arrayed at degree intervals around the inner flow control tube 20. Preferably, the oil flow rate through the four bypass valve units 48 when actuated is equal to the oil flow rate through the inner flow control tube 20.

Figure 11:
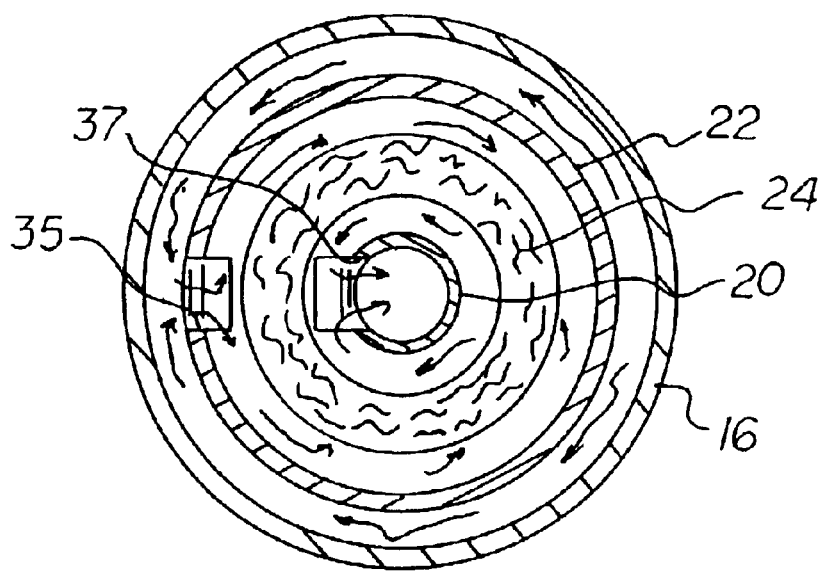
FIG. 11 is a cross-sectional view of the embodiment of the invention of FIG. 7, taken along line 11—11 thereof, wherein a pre-filtration zone passageway and a post-filtration zone passageway are provided by horizontal tabs.
Figure 12:
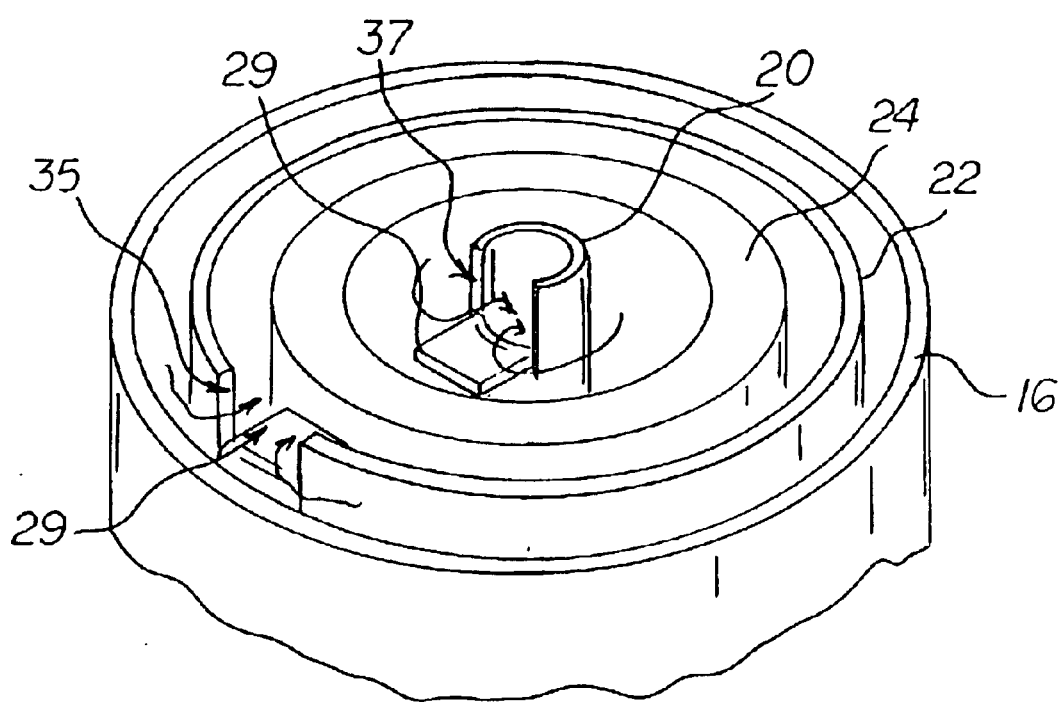
FIG. 12 is a perspective of the embodiment of the invention shown in FIG. 11.
Figure 13:
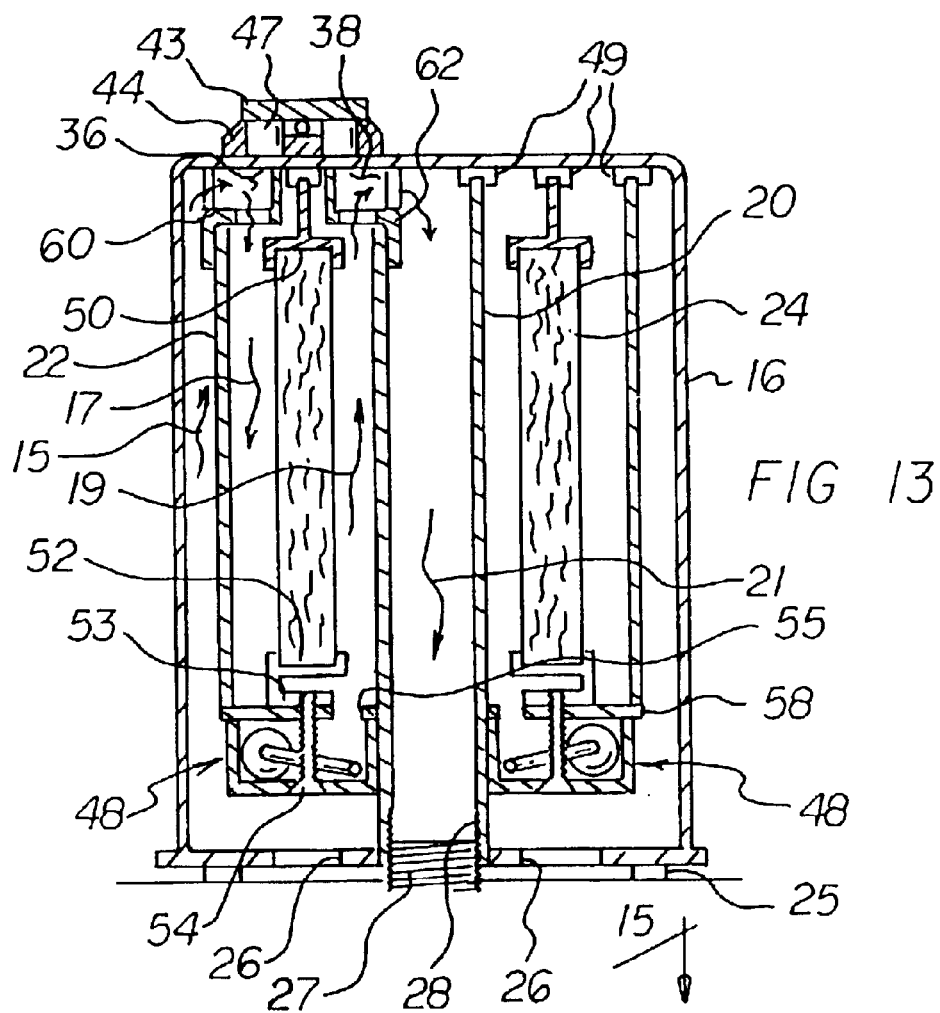
FIG. 13 is a cross-sectional view of another embodiment of the invention which includes a pre-filtration funnel clip and a post-filtration funnel clip.
Figure 14:
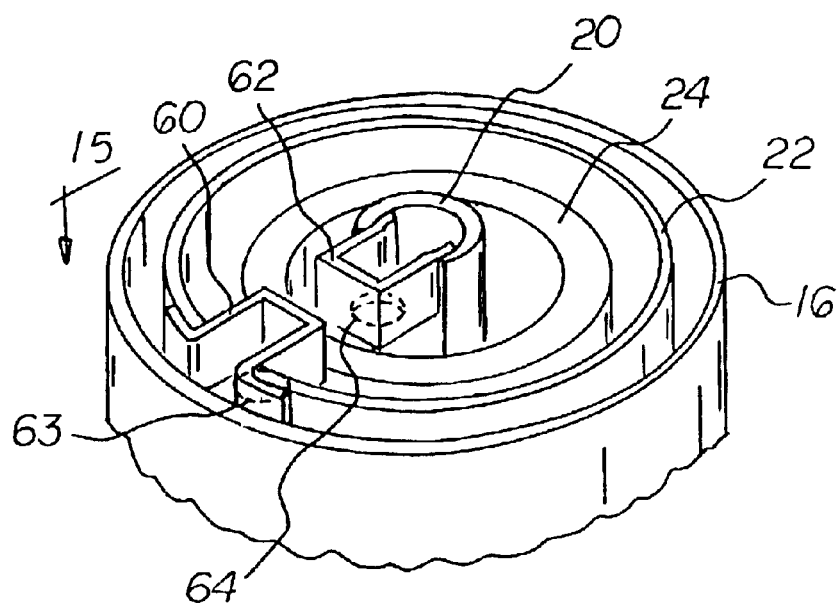
FIG. 14 is a perspective of the embodiment of the invention shown in FIG. 13.
Figure 14A:
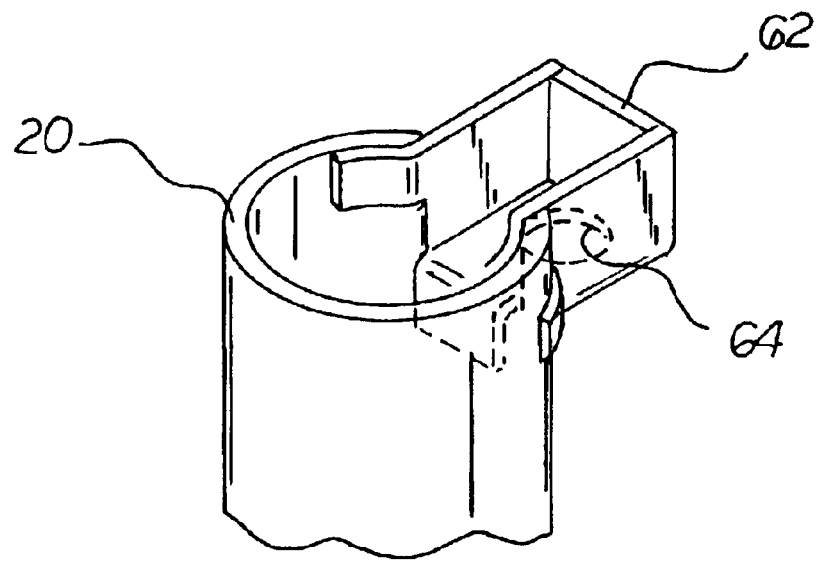
FIG. 14a is a rear perspective view of the post-filtration funnel clip shown in FIG. 14.
Figure 14B:
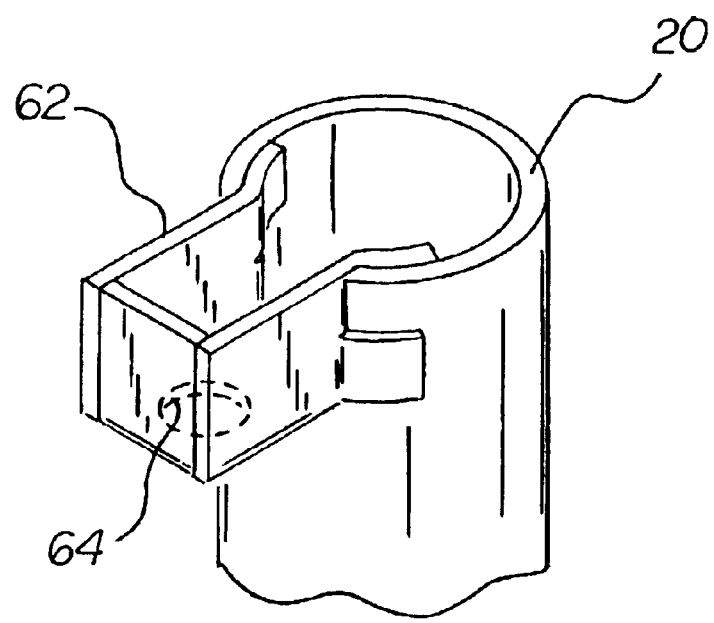
FIG. 14b is a front perspective view of the post-filtration funnel clip shown in FIG. 14.

As shown in FIGS. 7, 11, and 12, the pre-filtration zone passageway 35 is formed by a horizontal tab 29 made from the outer flow control tube 22, and the post-filtration zone passageway 37 is formed by a horizontal tab 29 made from the inner flow control tube 20.

Alternatively, as shown in FIGS. 12a and 12b, the pre-filtration zone passageway 35 is formed by vertical passageway walls 31 made in the outer flow control tube 22, and the post-filtration zone passageway 37 is formed by vertical passageway walls 31 made in the inner flow control tube 20.

For efficient oil flow, the cross-sectional area of the pre-filtration zone passageway 35 is substantially equal to the cross-sectional area of the post-filtration zone passageway 37 which is substantially equal to the cross-sectional area of the inner flow control tube 20.

Turning to FIGS. 13–16, another embodiment of the invention is shown. Reference numerals are shown that correspond to like reference numerals that designate like elements shown in the other figures. In addition, the pre-filtration zone passageway is formed as a first funnel clip orifice 63, and the post-filtration zone passageway is formed as a second funnel clip orifice 64.

The first funnel clip orifice 63 is formed in a pre-filtration funnel clip 60 that clips into an opening in the outer flow control tube 22, and the second funnel clip orifice 64 is formed in a post-filtration funnel clip 62 that clips into an opening in the inner flow control tube 20. The first funnel clip orifice 63 serves as a chute or funnel to direct oil flow directly toward the magnet unit 46 in a perpendicular direction with respect to the magnet unit 46 and the magnetic field emanating therefrom. Similarly, the second funnel clip orifice 64 serves as a chute or funnel to direct oil flow directly away from the magnet unit 46 in a perpendicular direction with respect to the magnet unit 46 and the magnetic field emanating therefrom.

For purposes of illustration, the first funnel clip orifice 63 and the second funnel clip orifice 64 have respective cross-sectional surface areas which are less than the cross-sectional surface area of the inner flow control tube 20. Such relatively small funnel clip orifices 63, 64 provide for relatively long exposure times of the flowing oil to the respective magnetic fields in the respective pre-filtration magnetic treatment zone 36 and post-filtration magnetic treatment zone 38. However, for most efficient oil flow, the cross-sectional area of the first funnel clip orifice 63 would be substantially equal to the cross-sectional area of the second funnel clip orifice 64 which would be substantially equal to the cross-sectional area of the inner flow control tube 20.

When plural magnet units 46 are employed, the cumulative cross-sectional surface area of the plural first funnel clip orifices 63 and the cumulative cross-sectional surface area of the plural second funnel clip orifices 64 can be equal to the cross-sectional surface area of the inner flow control tube 20.

Each of the pre-filtration funnel clip 60 and the post-filtration funnel clip 62 is formed from the funnel clip blank 65 shown in FIG. 16, along the fold lines 67. Moreover, respective outer tab portions 69 and respective inner tab portions 70 serve as clamping portions for the respective outer flow control tube 22 and inner flow control tube 20, as shown in the drawings.

Figure 17:
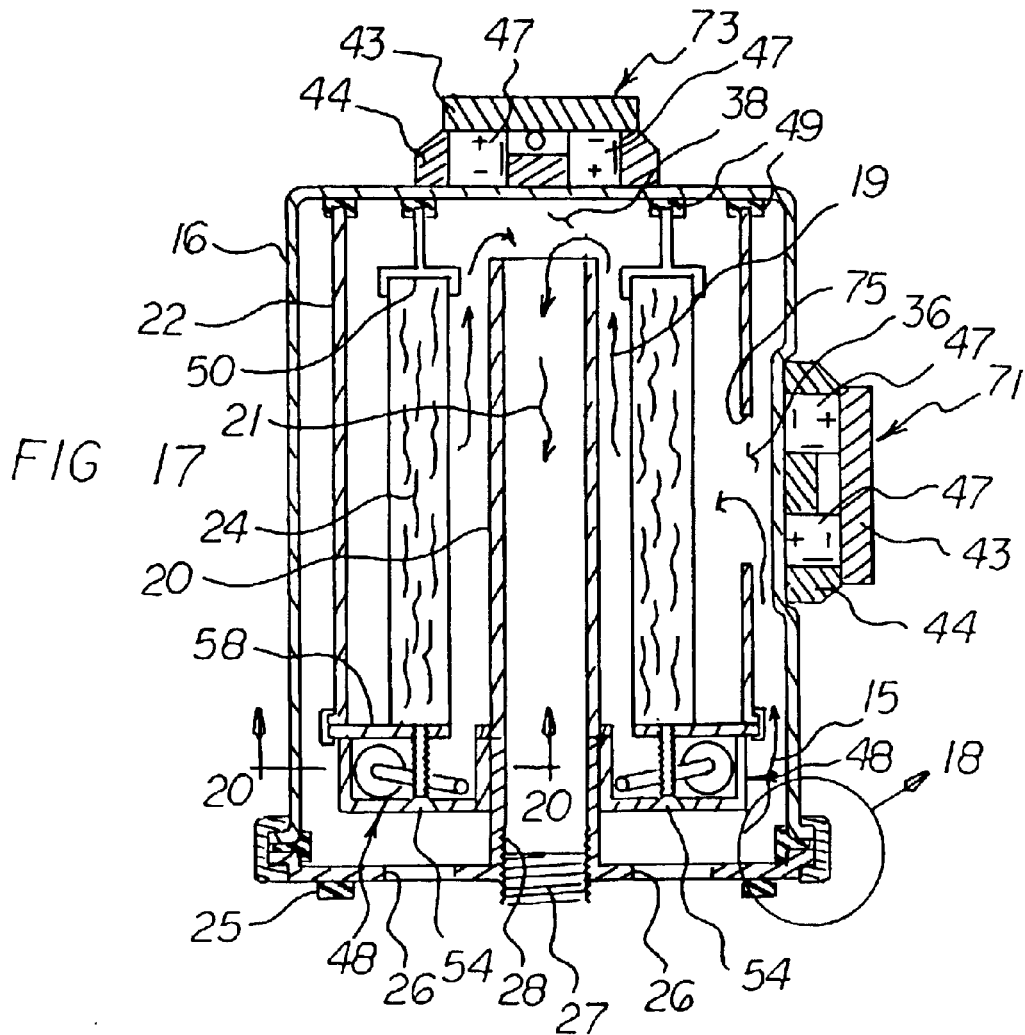
FIG. 17 is a cross-sectional view of another embodiment of the invention which includes one magnet unit for providing a pre-filtration magnetic treatment zone and another magnet unit for providing a post-filtration magnetic treatment zone.
Figure 18:
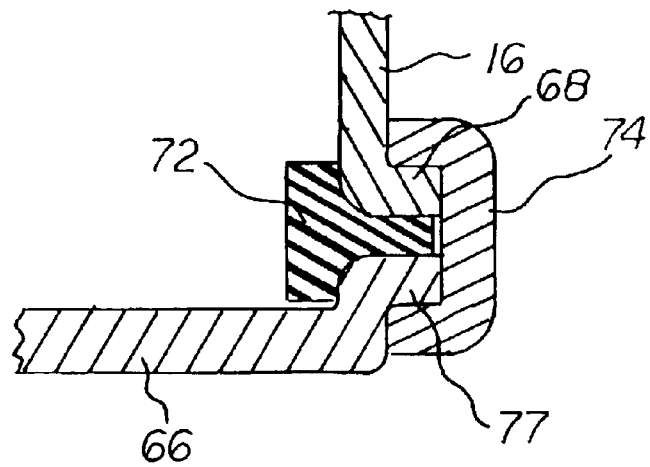
FIG. 18 is an enlarged view of the portion of the embodiment shown in circled region 18 of FIG. 17.
Figure 19:
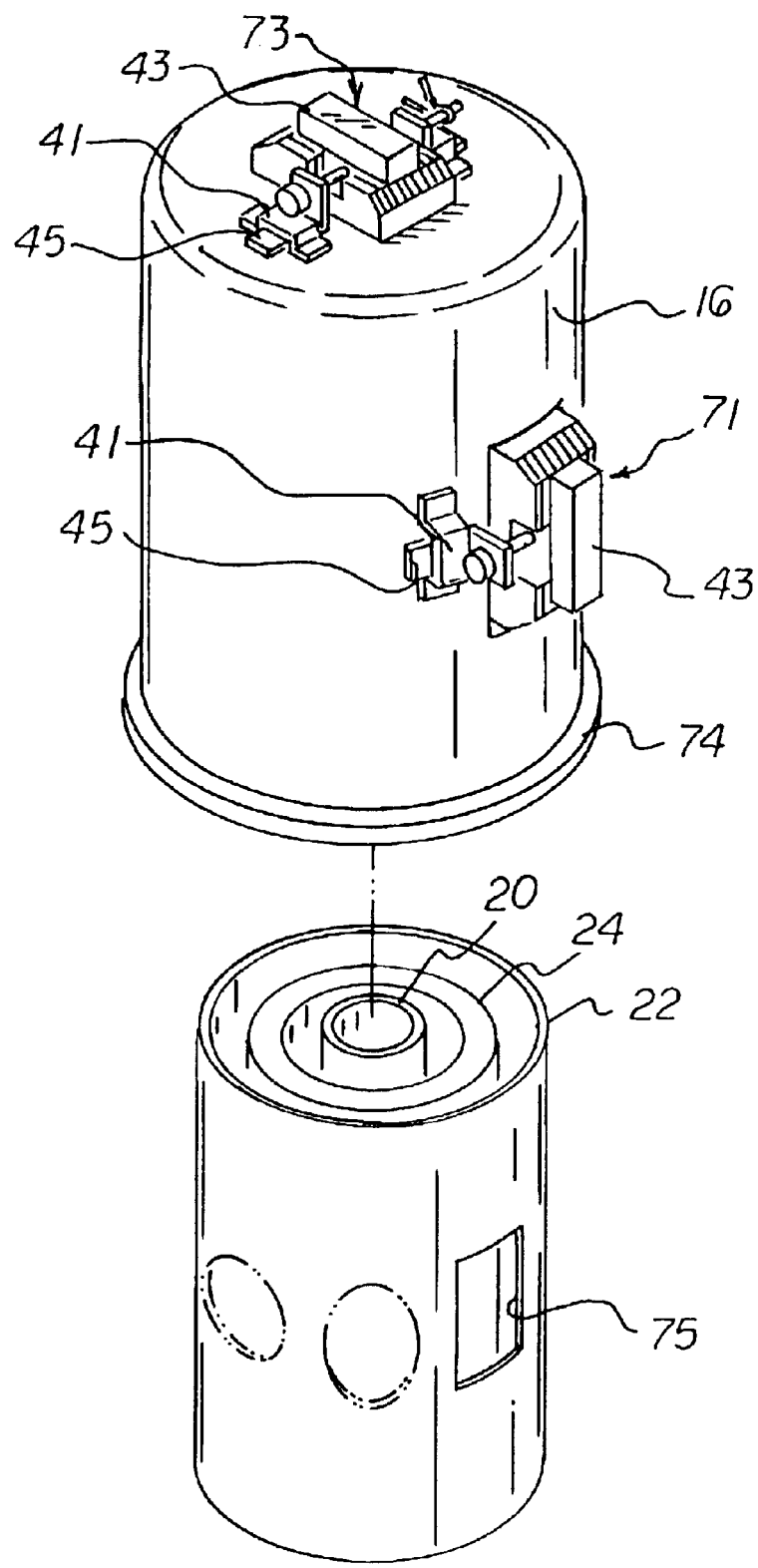
FIG. 19 is an exploded perspective view of the embodiment of the invention shown in FIG. 17.
Figure 20:
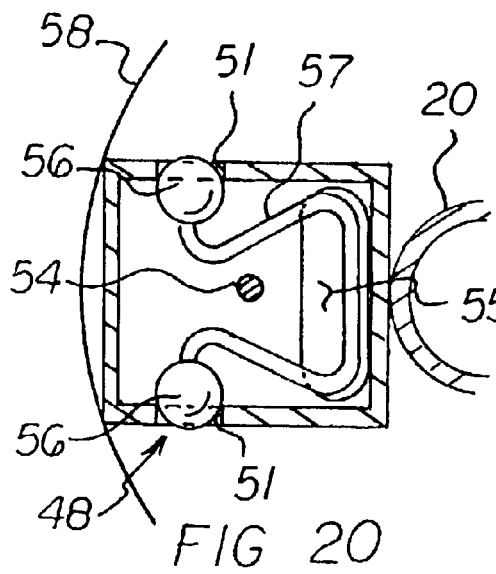
FIG. 20 is an enlarged cross-sectional view of a bypass valve unit of the embodiment of the invention shown in FIG. 17, taken along line 20—20 thereof.

Turning to FIGS. 17–19, another embodiment of the invention is shown. Reference numerals are shown that correspond to like reference numerals that designate like elements shown in the other figures. In addition, a first magnet unit 71 is placed on the outside of the cartridge housing 16 in a first position. The first position is in registration with a first flow orifice 75 in the outer flow control tube 22, whereby the pre-filtration magnetic treatment zone 36 is situated between the first position and the first flow orifice 75. A second magnet unit 73 is placed on the outside of the cartridge housing 16 in a second position which is in registration with the inner flow control tube 20, whereby the post-filtration magnetic treatment zone 38 is situated between the second position and the inner flow control tube 20.

The cartridge housing 16 includes a housing bottom lip 68 and further includes a housing mounting plate 66 which has a mounting plate lip 77. A lip-to-lip gasket 72 is placed between the housing bottom lip 68 and the mounting plate lip 77, and a lip-gasket-lip clamping member 74 clamps the housing bottom lip 68 to the mounting plate lip 77 with the lip-to-lip gasket 72 therebetween.

With this embodiment of the invention, oil enters through cartridge oil input channel 26, moves up toward the first magnet unit 71 as indicated by directional arrow 21, passes through the pre-filtration magnetic treatment zone 36, passes through the first flow orifice 75, passes through the hollow cylindrical filter element 24, passes upward toward the second magnet unit 73 as indicated by directional arrow 19, passes through the post-filtration magnetic treatment zone 38, and passes into the inner flow control tube 20 as indicate by directional arrow 21.

A wide variety of embodiments of the bypass valve unit 48 can be employed. The embodiment of the bypass valve unit 48 shown in FIGS. 20, 20A, 20B, 20C, and 20D is substantially the same as the embodiment of the bypass valve unit 48 shown in FIG. 8.

Figure 21:
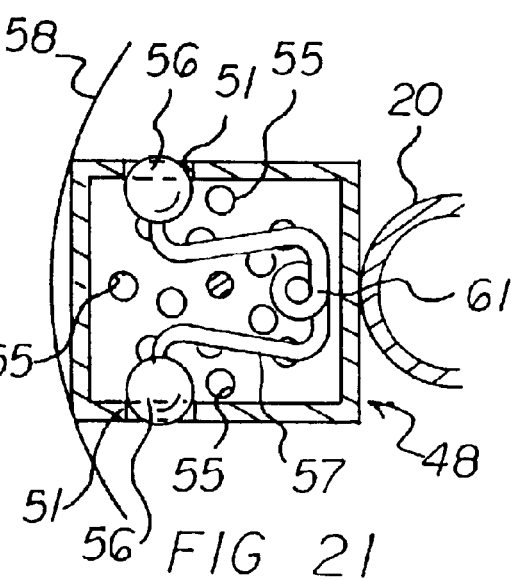
FIG. 21 is a cross-sectional view of an alternate bypass valve unit.
Figure 21A:
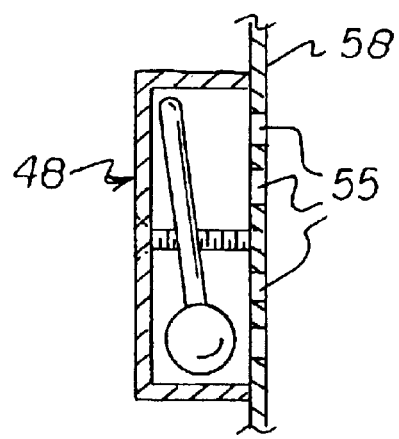
FIG. 21A is a cross-sectional view of the alternate bypass valve unit of FIG. 21.

Another embodiment of the bypass valve unit 48 is shown in FIGS. 21 and 21A. The valving-element tension spring 57 includes a tensioning loop 61, and the bypass exit channel 55 is in the form of a plurality of relatively small diameter orifices 55.

Figure 22:
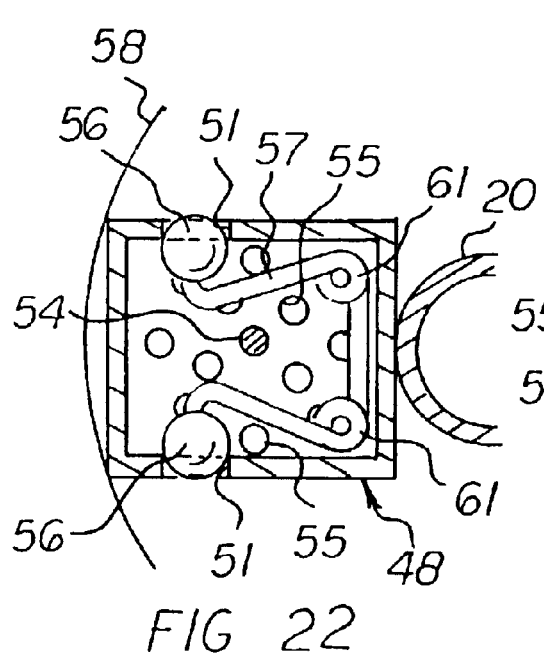
FIG. 22 is a cross-sectional view of still another alternate bypass valve unit.
Figure 22A:
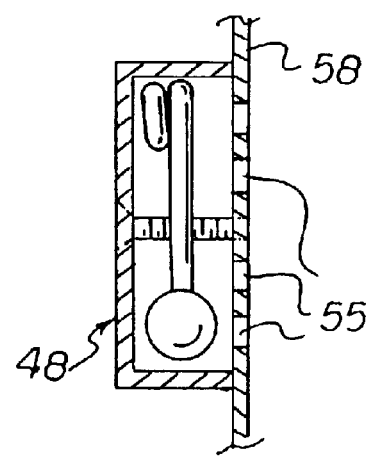
FIG. 22A is a cross-sectional view of the alternate bypass valve unit of FIG. 22.

Another embodiment of the bypass valve unit 48 is shown in FIGS. 22 and FIG. 22A. The valving-element tension spring 57 includes two tensioning loops 61, and the bypass exit channel 55 is in the form of a plurality of relatively small diameter orifices 55.

Figure 23:
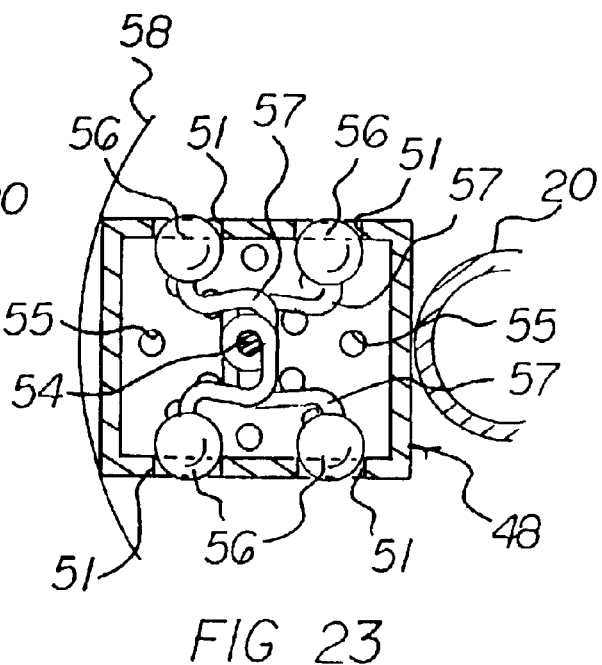
FIG. 23 is a cross-sectional view of yet another alternate bypass valve unit.
Figure 20A:
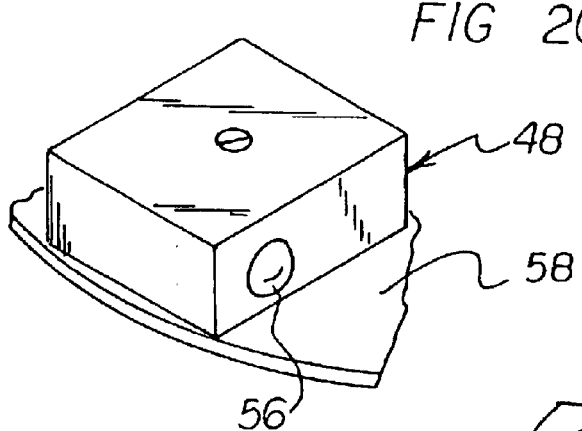
FIG. 20A is an up-side-down perspective view of the bypass valve unit of FIG. 20.
Figure 20B:
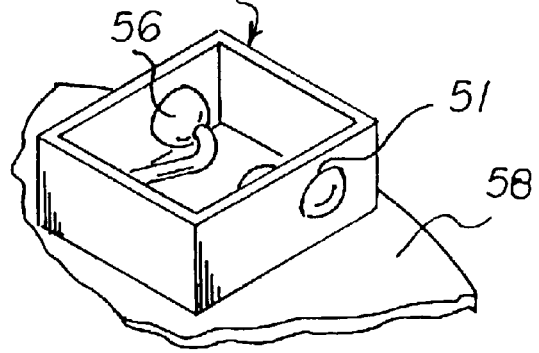
FIG. 20B is a perspective view of the bypass valve unit of FIG. 20 showing the bottom floor portion thereof removed for the sake of presentation.
Figure 20C:
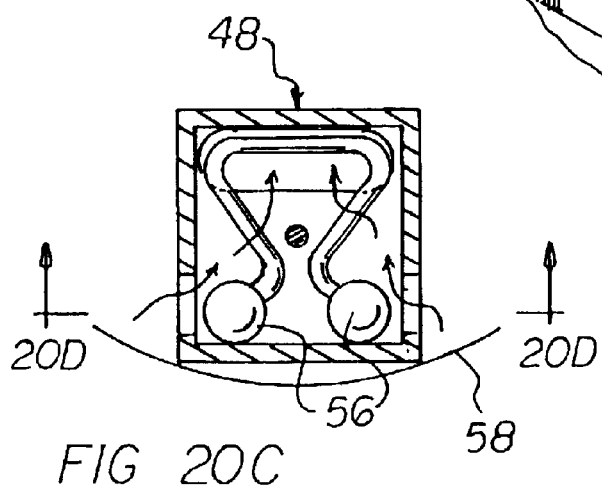
FIG. 20C is an enlarged cross-sectional view of a bypass valve unit of the embodiment of the invention shown in FIG. 17, taken along line 20—20 thereof showing the valve in the bypass mode when oil pressure exceeds a predetermined minimum.
Figure 20D:
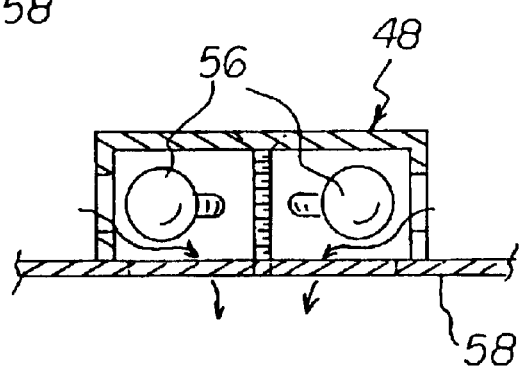
FIG. 20D is cross-sectional view taken along line 20D—20D of FIG. 20C.
Figure 23A:
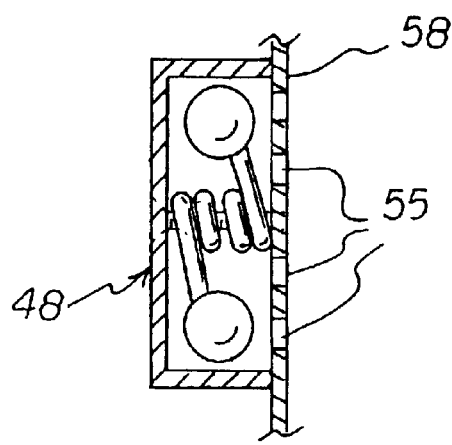
FIG. 23A is a cross-sectional view of the alternate bypass valve unit of FIG. 23.

Another embodiment of the bypass valve unit 48 is shown in FIGS. 23 and 23A wherein two valving-element tension springs 57 are employed for controlling two pairs of valving elements 56. Also, the bypass exit channel 55 is in the form of a plurality of relatively small diameter orifices 55.

Figure 28:
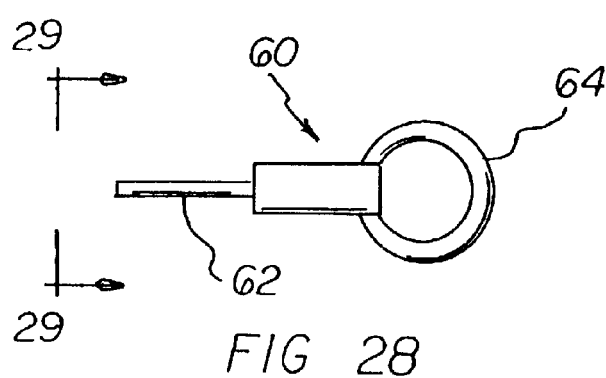
FIG. 28 is a plan view of a spring-compression tool used to assemble the bypass valve unit of FIGS. 24–27.
Figure 29:
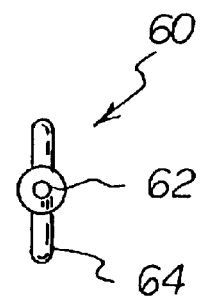
FIG. 29 is an end view of the spring-compression tool of FIG. 27.
Figure 24:
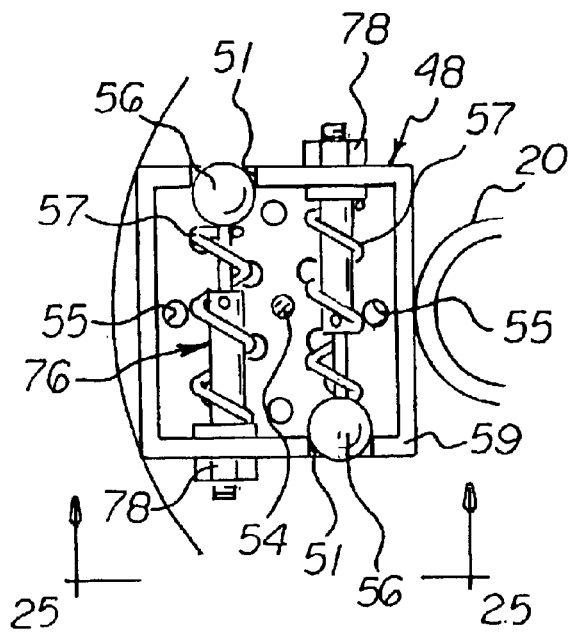
FIG. 24 is a cross-sectional view of still another alternate bypass valve unit.
Figure 25:
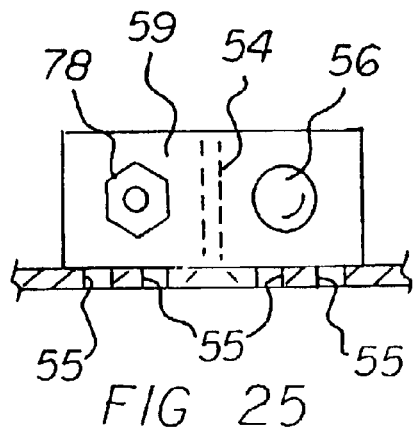
FIG. 25 is front view of the bypass valve unit shown in FIG. 24 taken along line 25—25 thereof.
Figure 26:
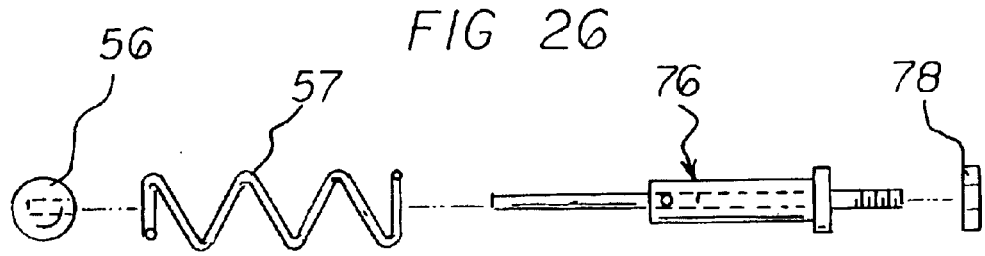
FIG. 26 is an exploded view of portions of the bypass valve unit shown in FIG. 24.
Figure 27:
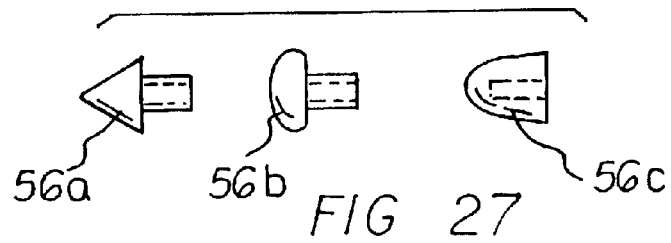
FIG. 27 illustrates an number of alternate embodiments of valving elements used in the bypass valve unit of FIG. 24.

Another embodiment of the bypass valve unit 48 is shown in FIGS. 24–27 wherein each valving element 56 is controlled by an individual helical spring 57. Each helical spring 57 jackets a valving element support assembly 76. A fastening nut 78 is used to secure a valving element support assembly 76 to the bypass valve housing 59. Also, the bypass exit channel 55 is in the form of a plurality of relatively small diameter orifices 55. As shown in the figures described thus far, the valving element 56 is in a form of a sphere. However, FIG. 27 shows other shapes for the valving element as valving elements 56a, 56b, and 56c. As shown in FIGS. 28 and 29, a simple spring-compression tool 60 having an end rod 62 and an opposed handle 64 may advantageously be used to compress helical spring 57 to enable the valving element 56 to be seated in the opening 51 when the bypass valve of FIGS. 24–26 is being installed on plate 58. Thus, the spring 57 may be temporarily held in the compressed condition by inserting end rod 62 into a suitable hole (unlabeled) in the valving element support assembly 76 as will occur to those of ordinary skill.

The components of the magnetically enhanced oil filter apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved magnetically enhanced oil filter apparatus that is low in cost, relatively simple in design and operation, and which may advantageously be used to direct a concentrated flow of oil inside the oil filter cartridge in the vicinity of a magnet attachment. With the invention, a magnetically enhanced oil filter apparatus provides that substantially all of the oil flowing inside the cartridge housing comes under the influence of a magnetic field of at least one magnet unit. With the invention, a magnetically enhanced oil filter apparatus provides that oil passes through a pre-filtration magnetic treatment zone, prior to passing through a hollow cylindrical filter element, and then passes through a post-filtration magnetic treatment zone, after passing through the filter element. With the invention, a magnetically enhanced oil filter apparatus is provided which can include bypass valve units for bypassing a filter element in the event that excessive oil pressure builds up inside the oil filter cartridge. With the invention, a magnetically enhanced oil filter apparatus provides oil flow orifices inside the oil filter cartridge which have sufficiently large size to be equal to the size of an orifice from which oil flows out from the oil filter cartridge.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

What is claimed as being new and desired to be protected by Letters Patent of the United States is as follows:

1. A magnetically enhanced oil filter apparatus, comprising:
   a cartridge housing which includes a cartridge oil input channel and an outlet channel, wherein said cartridge housing defines a cartridge interior space,
   a magnet unit affixed to an outside portion of said cartridge housing, whereby a magnetic field from said magnet unit extends into said cartridge interior space providing an interior magnetic field zone,
   a hollow annular filter element,
   filter positioning means, housed in said cartridge interior space, for supporting and positioning said hollow annular filter element, and
   oil flow control means, housed in said cartridge interior space and entering said interior magnetic field zone, for directing oil flow to and from said hollow annular filter element, wherein said oil flow control means are positioned with respect to said hollow annular filter element and said interior magnetic field zone such that said interior magnetic field zone is divided into a pre-filtration magnetic treatment zone and a post-filtration magnetic treatment zone.

2. The apparatus of claim 1 wherein said filter positioning means include a filter-element-reception well.

3. The apparatus of claim 1 wherein said outlet channel is internally threaded for attachment to an externally threaded cartridge mounting stem.

4. The apparatus of claim 1 wherein said magnet unit includes:
   a disk-shaped magnet placed on the top of said cartridge housing, wherein said disk-shaped magnet is coextensive with the entire top surface of said cartridge housing, a magnetic flux concentrator plate placed on top of said disk-shaped magnet, retention-rod-reception brackets extending upward from said flux concentrator plate, retention plates affixed to side portions of said cartridge housing, and a retention rod threaded through said retention plates and said retention-rod-reception brackets for fixing said disk-shaped magnet and said flux concentrator plate on said cartridge housing.

5. The apparatus of claim 1 wherein said magnet unit covers only about one-half of the top of said cartridge housing.

6. The apparatus of claim 1 wherein said cartridge housing includes first magnet unit mounting brackets.

7. The apparatus of claim 6 wherein said magnet unit includes:

a heat sink portion, cylindrical magnets contained with said heat sink portion, a magnet concentrator plate placed on top of said heat sink portion over said cylindrical magnets, second magnet unit mounting brackets which include mounting tabs received in said first magnet unit mounting brackets, a lock bolt threaded through said second magnet unit mounting brackets and said heat sink portion.

8. The apparatus of claim 1 wherein said oil flow control means are in a form of a dual, concentric flow tube assembly which includes an outer flow control tube and an inner flow control tube, wherein said hollow annular filter element is positioned between said outer flow control tube and said inner flow control tube.

9. The apparatus of claim 8 wherein:

said filter positioning means include a top filter cartridge holding channel member and a bottom top filter cartridge holding channel member, said outer flow control tube, said inner flow control tube, and said top filter cartridge holding channel member are supported inside said cartridge housing by means of concentric flow-director-tube-reception gaskets.

10. The apparatus of claim 9, further including:

a valve unit mounting bracket connected to a bottom portion of said bottom top filter cartridge holding channel member, a valve unit mounting plate positioned next to said valve unit mounting bracket, and a bypass valve unit connected to said valve unit mounting plate.

11. The apparatus of claim 10, further including:

a valve unit mounting screw for connecting said bypass valve unit to said valve unit mounting plate and said valve unit mounting bracket.

12. The apparatus of claim 11 wherein said bypass valve unit includes:

a bypass valve housing, a bypass entrance channel and a bypass exit channel in said bypass valve housing, a valving element located at said bypass entrance channel, and a valving-element tension spring for controlling operation of said valving element.

13. The apparatus of claim 12 wherein said valve unit mounting plate includes four fastener-reception channels for receiving four bypass valve units.

14. The apparatus of claim 8 which includes four bypass valve units arrayed at 90 degree intervals around said inner flow control tube.

15. The apparatus of claim 8 wherein:

said outer flow control tube includes a pre-filtration zone passageway, and said inner flow control tube includes a post-filtration zone passageway.

16. The apparatus of claim 15 wherein said pre-filtration zone passageway is formed by a horizontal tab being made in said outer flow control tube, and said post-filtration zone passageway is formed by a horizontal tab being made in said inner flow control tube.

17. The apparatus of claim 15 wherein said pre-filtration zone passageway is formed by vertical passageway walls being made in said outer flow control tube, and said post-filtration zone passageway is formed by vertical passageway walls being made in said inner flow control tube.

18. The apparatus of claim 15 wherein:

said pre-filtration zone passageway is formed as a first funnel clip orifice, and said post-filtration zone passageway is formed as a second funnel clip orifice.

19. The apparatus of claim 18 wherein:

said first funnel clip orifice is formed in a pre-filtration funnel clip that clips into an opening in said outer flow control tube, said second funnel clip orifice is formed in a post-filtration funnel clip that clips into an opening in said inner flow control tube.

20. The apparatus of claim 1 wherein:

a first magnet unit is placed on the outside of said cartridge housing in a first position, wherein said first position is in registration with a first flow orifice in said outer flow control tube, whereby said pre-filtration magnetic treatment zone is situated between said first position and said first flow orifice, and a second magnet unit is placed on the outside of said cartridge housing in a second position which is in registration with said inner flow control tube, whereby said post-filtration magnetic treatment zone is situated between said second position and said inner flow control tube.

21. The apparatus of claim 20 wherein said cartridge housing includes a housing bottom lip and, further including a housing mounting plate which has amounting plate lip, a lip-to-lip gasket placed between said housing bottom lip and said mounting plate lip, and a lip-gasket-lip clamping member for clamping said housing bottom lip to said mounting plate lip with said lip-to-lip gasket therebetween.

* * * * *